United States Patent [19]
Hopkins, Jr. et al.
[11] 3,843,837
[45] Oct. 22, 1974

[54] APPARATUS FOR GENERATING SAMPLE PULSES IN A TELEPHONE IMAGE TRANSMISSION SYSTEM

[75] Inventors: Robert Sherman Hopkins, Jr., Lake Park; David Martin Miller, Palm Beach Gardens, both of Fla.

[73] Assignee: RCA Corporation, New York, N.Y.

[22] Filed: Aug. 10, 1973

[21] Appl. No.: 387,346

[52] U.S. Cl. ............................ 178/7.1, 178/DIG. 3
[51] Int. Cl. ............................................ H04n 5/00
[58] Field of Search ........... 179/15 BS, 2 TC, 2 TV; 178/7.1, 69.5 G, 69.5 TV, DIG. 3, 69.5 R; 328/72, 151, 63; 307/247

[56] References Cited
UNITED STATES PATENTS 3,061,672 10/1962 Wyle ............................ 178/DIG. 3

*Primary Examiner*—Richard Murray
*Assistant Examiner*—R. John Godfrey
*Attorney, Agent, or Firm*—Eugene M. Whitacre; Charles I. Brodsky

[57] ABSTRACT

A frame of stored video information may be considered to comprise a matrix of columns and rows. Correct transmission of this information requires that the sampling of the video elements, column-by-column and row-by-row, be precisely carried out. Two constructions are herein described as employing digital techniques in order to sequentially transmit the information elements along a voice-grade telephone line to be reproduced in a picture display.

5 Claims, 4 Drawing Figures

| SCAN LINE NUMBER | SAMPLING ORDER |
|---|---|
| 1 | 1 |
| 264 | 362 |
| 2 | 198 |
| 265 | 34 |
| 3 | 395 |
| 266 | 231 |
| 4 | 67 |
| 267 | 428 |
| 5 | 264 |
| 268 | 100 |
| 6 | 461 |
| 269 | 297 |
| 7 | 133 |
| 270 | 494 |
| 8 | 329 |
| 271 | 165 |
| 9 | 2 |
| 272 | 363 |
| 10 | 199 |
| 273 | 35 |
| 11 | 396 |
| 274 | 232 |
| 12 | 68 |
| 275 | 429 |
| 13 | 265 |
| 276 | 101 |
| 14 | 462 |
| 277 | 298 |
| 15 | 134 |
| 278 | 495 |
| 16 | 330 |
| 279 | 166 |
| 17 | 3 |
| • | • |
| • | • |
| • | • |
| • | • |
| • | • |
| 524 | 132 |
| 262 | 493 |
| 525 | 323 |
| 263 | 164 |

APPARATUS FOR GENERATING SAMPLE PULSES IN A TELEPHONE IMAGE TRANSMISSION SYSTEM

FIELD OF THE INVENTION

Pending U.S. Pat. application Ser. No. 257,412, filed May 26, 1972, and entitled "TELEPHONE IMAGE TRANSMISSION SYSTEM" (RCA 64,997) describes a system which is capable of transmitting still television pictures of three-dimensional objects over communications channels such as long-distance unequalized voice-grade telephone lines. A television camera is therein employed to continually provide a video signal to a storage tube in which any one video frame of information can be "frozen". The single frame stored—i.e., the picture to be transmitted—is then converted to an audio frequency signal for transmission over telephone type communications links to a remote receiver location, where a second storage tube is used to store the audio frequency information transmitted. Upon completion of the transmission, the audio information stored at the receiver is converted back to a video signal for viewing on a monitor. The transmitted signal is essentially frequency modulated, in that its instantaneous frequency is directly proportional to the brightness level of the stored picture element then being transmitted.

As is therein described, the video frame to be transmitted may be considered to comprise a matrix of horizontal lines and vertical columns. This matrix of elements of information (each element possessing a gray level indicative of video brightness) is transmitted, column-by-column and line-by-line, until the gray level of all elements are sent. In order to accurately transmit this stored video image by a sample-and-hold technique in which the output signal transmitted remains at its gray level for one element of the matrix until it assumes the gray level of the next element to be transmitted, it will be apparent that precise sampling is needed to gate the element in accordance with its column and line position in the matrix. As suggested in the Ser. No. 257,412 application, an element in the matrix array can be precisely located by specifying both the horizontal line which contains the element (i.e., the television line which locates the element along the vertical picture axis) and, also, a clock cycle along that (i.e., defining the column location along the horizontal picture axis).

It has been the custom in other picture transmission systems in developing this sample gating to generate a voltage sawtooth signal which corresponds to each television line or row. A second voltage sawtooth signal is generated to have a period equal to the picture transmission time, and the two sawtooths are applied to a voltage comparator stage. Thus, as the slower sawtooth proceeds from 0–100 percent of its amplitude, the time at which the comparator develops an output signal when the two sawtooths are equal in amplitude slowly works its way from the left end of each television line to the right end—that is, from 0–100 percent of the duration of the television line sawtooth. One readily seen problem in this arrangement is that the slower sawtooth must be very noise-free and linear in order to prevent any misplacement of picture element location due to mistiming of the point at which the comparator recognizes both input sawtooths as being of equal amplitude. Such misplacements tend to distort the reproduction of straight lines in a picture display by giving to them a slant which was not present in the object scene. Such misplacements also tend to cause brightness variations, especially where the slanted straight lines tend to overlap other reproduced image informations.

SUMMARY OF THE INVENTION

As will become clear hereinafter, each of the two constructions described below employ digital, rather than analog, techniques to develop the sampling pulse by which the element of stored video information is gated onto the audio communications link. In the first embodiment, the oscillations of a master clock are counted down to typical horizontal and vertical drive scanning rates, and applied to a digital comparator to provide the clock cycle pulses along each television line. A pair of binary counters are utilized, one to provide an indication of the horizontal count obtained from the master clock and the other to provide the column count, obtained from the vertical frequency. In the second construction to be described, the column counter and comparator are replaced by a standard flip-flop circuit which, together with an AND gate, provide the clock cycle pulses from which the sampling signal is developed. In this second configuration, it will be seen that the interconnections are such that the developed sample pulses are spaced over one columnar interval, to effectively select picture elements proceeding from the left to the right of the stored image pattern.

As will also be seen from the description that follows, the vertical drive frequency employed is less than that normally used in television scanning, in an attempt to match the sampling rate with the bandwidth limitations of the telephone communications link. That is, the vertical signal employed may be of the order of 1/8the usual 60 cycle vertical signal in a manner similar to that described in the Ser. No. 257,412 case for providing successively transmitted signals to appear geographically adjacent in the reproduced display. In other picture transmission systems, no such similar slow scan techniques are incorporated, with the ensuing results not only being an offset in the reproduced image because of possible noise presences, but an additional effective "ghosting" because adjacent samples in the image to be transmitted are not sent along the communications line in adjacent sequence. The result of this omission of slow scan causes an ultimate picture display to be one in which the misplacement of geographically adjacent samples in the stored image $I_1$, $I_2$ (because of the presence of sawtooth noise) will be substantially greater if the information element $I_2$ is transmitted later in time, the offset at that interval being substantially greater because of the delayed coincidence of the two sawtooth waves compared. The result of such operation is that the reproduced image presents a "tearing" effect, which appears quite objectionable.

BRIEF DESCRIPTION OF THE DRAWINGS

These and other features of the present invention will be more clearly understood from a consideration of the following description taken in connection with the accompanying drawings in which.

DETAILED DESCRIPTION OF THE DRAWINGS

Figures 1, 2:
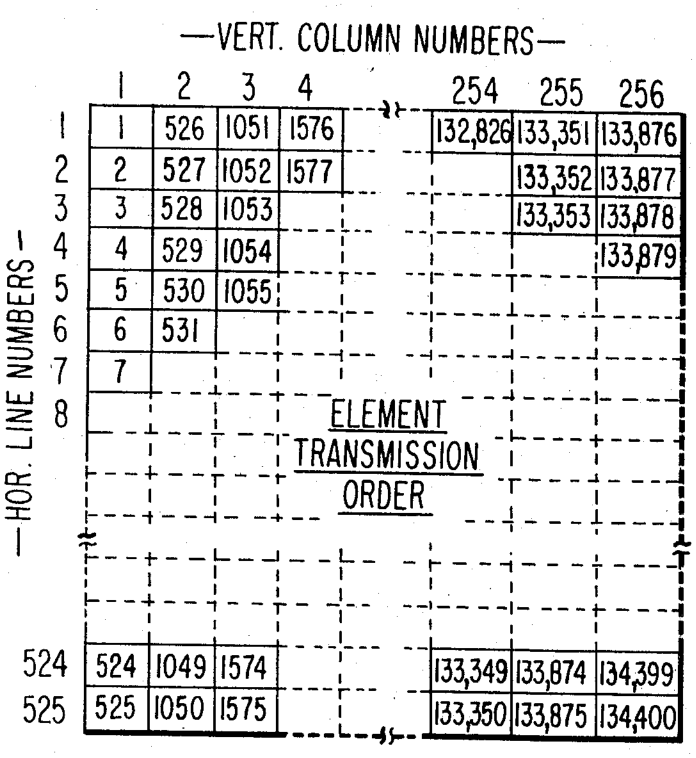
FIG. 1 is a diagram showing the order in which stored picture elements of the Ser. No. 257,412 application are converted to audio frequency signals for transmission.
FIG. 2 is a diagram showing the order for transmission present in other picture transmission systems employing analog techniques for generating timed sample pulses.

In FIG. 1, a video frame stored for transmission in accordance with the system of the aforementioned application may be arranged to be divided into 525 horizontal lines and 256 vertical columns. This matrix of 134,400 elements of information (each element possessing a gray level) may be transmitted, column-by-column, starting at the top left of the matrix—with each column of 525 lines requiring ¼ seconds for transmission, i.e., a transmission rate of 2,100 elements/second to be carried along a telephone line having a bandwidth of the order of 1 kHz and a video sampling rate limited to approximately twice that amount. The modulating signal is developed from the stored image video by sample-and-hold techniques in which the output signal remains at the gray level of the first element of the column for 178 milliseconds, at which time the output assumes the gray level of the second element of the column, remaining at that level for the next ½ milliseconds, and so on. If a matrix of 525 horizontal lines by 512 vertical columns were to be employed instead, the matrix of 268,800 elements of information would be transmitted, column-by-column, with each column of 525 lines then requiring 1/8 seconds for transmission, utilizing a bandwidth of 2 kHz.

FIG. 2 shows the order of transmission of picture elements in a transmission system employing a telephone line having a bandwidth of the order 1 kHz and a video sampling rate limited to approximately 2 kHz. A 2 kHz rate (as compared to the usual television line scanning rate of 15.75 kHz) means that the first sample of a column transmitted along the telephone line would be reproduced, when received, in television line No. 1—but the second sample would be reproduced in an interlaced scanning system in television line No. 9. The third sample would be reproduced in television line No. 17, while the thirty-fourth sample would occur in line No. 265, i.e., geographically situated between television lines No. 2 and No. 3.

With such arrangements, of the type employed in other picture transmission systems employing the aforementioned sawtooth comparison techniques for generating timed sample pulses, it will be noted that the first and second video elements transmitted would be located on lines No. 1 and No. 9, respectively, but would actually be separated by some 15 scan lines. These 15 lines respect approximately 1/33 of the picture height, which results in an undesirable "tearing" of the picture image.

Figure 3:
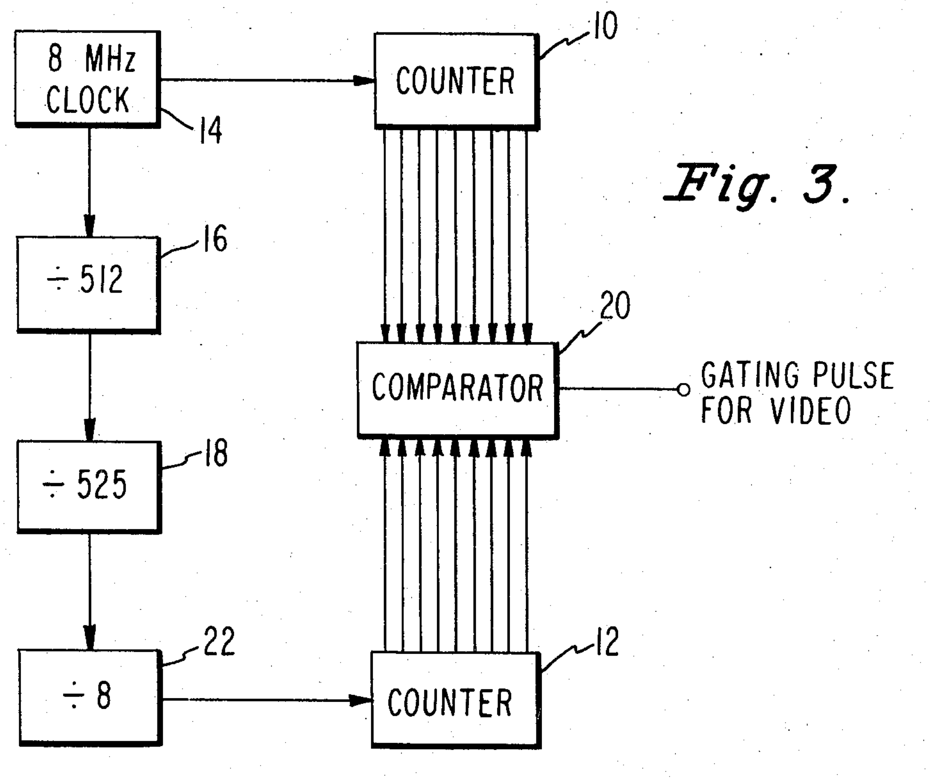
FIG. 3 is a block diagram of apparatus for generating sample pulses.

The apparatus of FIG. 3 employs digital, rather than analog, techniques for generating a sample pulse. In FIG. 3, a pair of counter stages 10, 12 are shown. In the case where the stored video image comprises an array of 512 columns and 525 rows, each of these counters may be 9 bits in length. A master clock 14, of 8 MHz frequency, for example, applies timing pulses to counter 10, which may be referred to as a "clock cycle counter". The pulse train developed by this clock 14 is also applied to a divide-by-512 circuit 16 and from there to a divide-by-525 stage 18. An output signal is available from the divider stage 16 providing indications approximately every 1/8 microseconds, indicative of the stepping from column to column of the FIG. 1 stored video frame, and useful in identifying, at any instant of time, that column in which an element of information is to be selected for transmission. Output pulse indications are available from the divider stage 18 in similar fashion to provide an indication of that row in each column in which the element of information is situated. A further divide-by-eight stage 22 is coupled to the output of the divider 18 to provide proper bandwidth in transmitting the video information through the telephone line.

A digital construction for providing sample pulse gating somewhat akin to the analog technique employed in other picture transmission systems can result from coupling the output signals from the divider 22 to the counter 12, and applying the output signals from counters 10 and 12 to a comparator 20 arranged to provide a pulse upon coincidence of the same count within the two counters. With such an arrangement, output pulses can be provided 512 times each line of video frame information.

Figure 4:
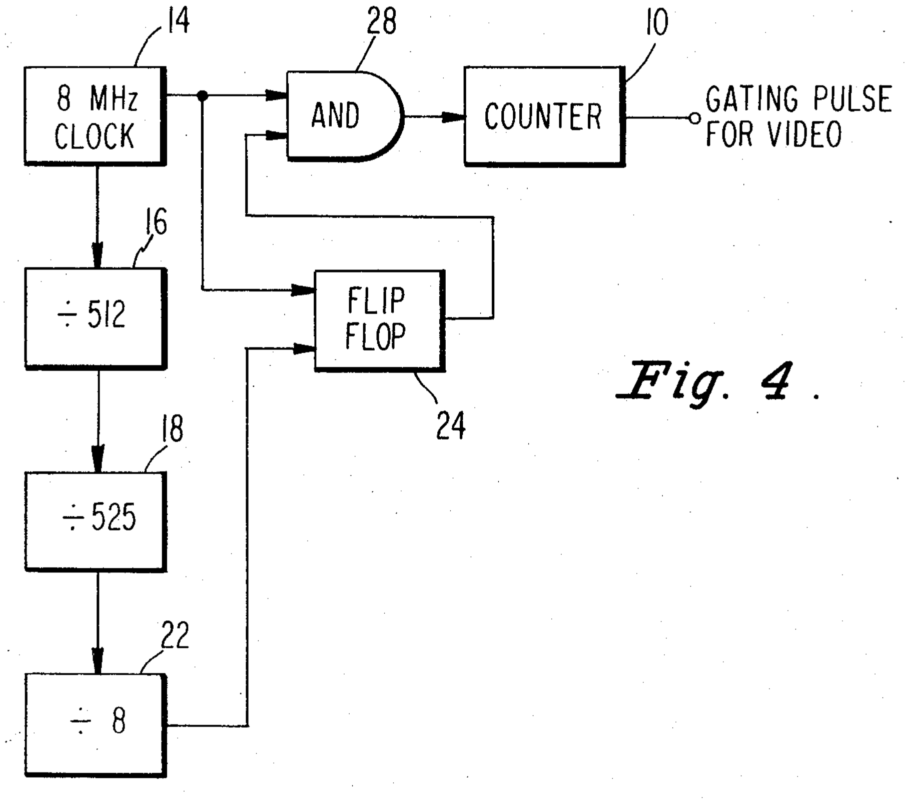
FIG. 4 is a block diagram of a modification of the construction of FIG. 3, embodying the present invention.

The apparatus of FIG. 4 is similar to that of FIG. 3 in the development of an output pulse to sample the elemental information at a rate to match the telephone bandwidth. It is also similar in that the end result will be a scanning of all elements in a first column, row-by-row, then a stepping over to the next column for the scanning of its entire line components, then a stepping to the third column, and so forth. The configuration is modified, however, in its elimination of the counter 12 and the comparator 20—and the insertion in its place of a flip-flop stage 24 and an AND gate 26. As shown, one input of the flip-flop stage 24 is coupled to receive the 8 MHz pulse train from the clock 14, while a second input to the flip-flop is coupled to the output of the divider stage 22. An output signal from the flip-flop 24 is applied to one input of the AND circuit 26, shown as being of two-leg construction, to a second input of which the 8 MHz pulse train is also coupled. The clock cycle counter 10 is, in this modification, coupled to the output of the AND stage 26.

With this construction, the flip-flop 24 may be initially set to condition the AND gate 26 to pass the clock pulse train to the counter 10. At the end of the counting of all rows in the first column, an output signal developed by the divider stage 22 is applied to reset the flip-flop 24 to its other state. Application of the next cycle of the 8 MHz pulse train will not pass the inhibited AND gate at this time, but will set the flip-flop 24 to its initial condition, causing it to pass the next succeeding cycle of the clock sequence. This, being analogous to the stepping from the first column to the second column, then permits the generation of sample pulses for the 525 line intervals in that second column. At the end of the generation of these sample pulses, the flip-flop stage 24 will again reset to insensitize the AND circuit to ignore the next supplied clock pulse until a further step to the third column occurs. It will be readily apparent that this ignoring of the first occurring clock pulse so as to respond to the following one corresponds to moving the columns from left to right. Output information signals can be generated in this version by coupling to the output of the clock cycle counter 10 and by gating an additional circuit to whose other inputs are applied the video information obtained from scanning the stored video image.

Whereas the apparatus of FIG. 3 has been noted to satisfactorily operate with emitter coupled logic, various problems have been noted when less expensive TTL circuitry is employed. As will be readily apparent, this follows the realization that pulse delay through the dividers 16, 18, 22 to the counter stage 12 will be greater than the pulse delay existent directly from the clock 14 to the counter 10. Under worst case designs of TTL logic, the comparator 20, in this arrangement, could provide its gating pulse at an incorrect time interval, and can even miss the generation of the desired sample pulse.

With the FIG. 4 construction, on the other hand, no such comparison of the output of counter 10 is made, one output alone being used to generate the gating pulses for video information. In this embodiment, the pulse delay through the dividers 16, 18, 22 continues to exist, but using a three stage flip-flop for the circuit 24 can assure that the AND circuit 28 will select the next occurring clock pulse, even though that pulse may occur three or four time intervals later. This construction will be seen to develop sample pulse outputs when they are supposed to occur, but will generate none at incorrect time intervals. While the costs of constructing the FIG. 3 and FIG. 4 arrangements are about the same, the FIG. 4 embodiment will operate correctly under worst case analysis, whereas the FIG. 3 construction could lead to incorrect samplings. For proper operation of the two apparatus, the counters 10 and 12 in the FIG. 3 version should be selected of an up-counting variety while the counter 10 of FIG. 4 should be selected as a down-counter.

What is claimed is:

1. In a television image transmission system of the type wherein an audio communications link is employed to transmit a particular frame of television information to a remote receiver location, apparatus for generating sampling pulses to sequentially transmit said frame information column-by-column and row-by-row, comprising:

means for supplying a pulse train of given frequency;

means responsive to said pulse train for providing first pulses at a repetition rate determined by the number of columns of information elements into which said television frame is divided and by the number of rows of informational elements within each column;

means responsive to said first pulses for providing second pulses at a reduced repetition rate to substantially match with the bandwidth characteristics of said communications link; and logic means actuated by said pulse train and by said second pulses to generate said output sampling pulses for said television information, said logic means including a flip-flop stage settable to a first conductive state by said second pulses and resettable to a second conductive state by that cycle of pulse train information next succeeding it in time, said logic means further including a pulse counter operative to generate said sample pulses only during those time intervals during which said flip-flop stage is in said second conductive state.

2. The apparatus of claim 1 wherein said logic means also includes an AND circuit having a first input terminal coupled to receive said pulse train, a second input terminal controlled to enable or inhibit said circuit as a function of the conductive state of said flip-flop stage, and an output terminal coupled to apply said pulse train information to said pulse counter when said flip-flop stage is in said second conductive state.

3. The apparatus of claim 2 wherein said first pulse providing means provides its pulses at a repetition rate corresponding to the division of said television frame into a matrix of 512 columns of information elements with 525 rows of informational elements in each column.

4. The apparatus of claim 3 wherein said pulse train supply means supplies a train of pulses of 8 MHz frequency.

5. The apparatus of claim 4 for use in a television image transmission system utilizing an unequalized voice-grade television line having a bandwidth of 2 kHz as its said audio communications link, wherein said second pulse providing means provides its pulses at substantially one-eighth the repetition rate of pulses provided by said first pulse providing means.

* * * * *

UNITED STATES PATENT OFFICE
CERTIFICATE OF CORRECTION

Patent No. 3,843,837 Dated October 22, 1974

Inventor(s) Robert Sherman Hopkins, Jr., et al.

It is certified that error appears in the above-identified patent and that said Letters Patent are hereby corrected as shown below:

At column 1, line 9, delete "(RCA 64,997)". At column 4, lines 37, 42, 46, and 48, change "26" to --28--.

Signed and sealed this 7th day of January 1975.

(SEAL)
Attest:

McCOY M. GIBSON JR.
Attesting Officer

C. MARSHALL DANN
Commissioner of Patents

FORM PO-1050 (10-69)
1530 6/72

USCOMM-DC 60376-P69
☆ U.S. GOVERNMENT PRINTING OFFICE : 1969 O—366-334